United States Patent [19]

Kawai

[11] Patent Number: 5,113,513

[45] Date of Patent: May 12, 1992

[54] APPARATUS AND METHOD FOR LOADING A PROGRAM IN AN EXTERNAL STORAGE DEVICE CONNECTED TO ONE BUS INTO A MEMORY CONNECTED TO A DIFFERENT BUS

[75] Inventor: Kazumasa Kawai, Tokyo, Japan

[73] Assignee: Kabushiki Kaisha Toshiba, Kawasaki, Japan

[21] Appl. No.: 290,474

[22] Filed: Dec. 27, 1988

[30] Foreign Application Priority Data

Dec. 28, 1987 [JP] Japan .................. 62-334689

[51] Int. Cl.⁵ .............................................. G06F 12/08
[52] U.S. Cl. ............................................. 395/425
[58] Field of Search ............... 364/243, 228.1, 238.4, 364/243.1, 255.1, 268.5, 964.7; 371/71

[56] References Cited

U.S. PATENT DOCUMENTS

| | | | |
|---|---|---|---|
| 4,077,059 | 2/1978 | Cordi et al. | 364/200 |
| 4,084,231 | 4/1978 | Capozzi et al. | 364/200 |
| 4,412,281 | 10/1983 | Works | 364/200 |
| 4,464,750 | 8/1984 | Tatematsu | 371/21 |
| 4,843,542 | 6/1989 | Dashiell et al. | 364/200 |
| 4,893,279 | 1/1990 | Rahman et al. | 364/200 |
| 4,897,783 | 1/1990 | Nay | 364/200 |

Primary Examiner—Salvatore Cangialosi
Attorney, Agent, or Firm—Cushman, Darby & Cushman

[57] ABSTRACT

An address for writing data in a host memory connected to a first bus is converted into an address for writing the data in an interface memory connected to a second bus. Connection/disconnection of the data line of the first bus to/from the data line of the second bus is controlled so that program data stored in an external storage device connected to the first bus is simultaneously written in the host memory at the writing address and the interface memory at the converted address to realize data transfer to the interface memory. A program can be directly transferred from the external storage device to the interface memory without going through the host memory, thus achieving high-speed program transfer.

17 Claims, 21 Drawing Sheets

APPARATUS AND METHOD FOR LOADING A PROGRAM IN AN EXTERNAL STORAGE DEVICE CONNECTED TO ONE BUS INTO A MEMORY CONNECTED TO A DIFFERENT BUS

BACKGROUND OF THE INVENTION

The present invention relates to an apparatus and method for transferring at high speed a program stored in an external storage device and, more particularly, to an apparatus and method for loading a program stored in an external storage device connected to a first bus to a second memory connected to a second bus.

A conventional program transfer method of this type will be described below with reference to FIG. 1. The portion above the broken line in FIG. 1 corresponds to a host device, and the portion therebelow corresponds to an interface device. The interface device controls, e.g., a LAN (Local Area Network). Program data executed by the interface device is stored in disk device 6 of the host device. Therefore, upon operation of the interface device, program data must be loaded from the host device to the interface device. When the program data stored in disk device 6 is transferred to interface memory 2, host CPU 5 reads out the program data from disk device 6 and first loads the data in host memory 1. Thereafter, host CPU 5 sets the destination address for interface memory 2 in address register 3. Host CPU 5 then reads out the program data in a predetermined unit, and stores the data in data register 4. When the program data and the destination address are set, interface CPU 7 reads out the destination address from address register 3 and the program data from data register 4, respectively, and loads the program data at the destination address of interface memory 2.

However, in the conventional program transfer method, the program data read out from disk device 6 is temporarily loaded in host memory 1, and is then transferred from host memory 1 to interface memory 2. Therefore, program transfer requires much transfer time.

SUMMARY OF THE INVENTION

The present invention has been made in consideration of the above situation, and has as its object to provide an apparatus and method for simultaneously loading a program stored in an external storage device connected into a first bus to a first memory connected to the first bus and a second memory connected to a second bus, thereby transferring data from the external storage device to the second memory at high speed.

According to the present invention, data from an external storage device is read out and a first address of a first memory connected to a first bus is generated. The first address is then converted into a corresponding second address of a second memory connected to a second bus by simultaneous write control means connected to the first and second buses. As a result, a simultaneous write enable control is performed. Connection and disconnection of the data lines of the first and second buses is controlled by bus connecting means, connected to the first and second buses under the simultaneous write enable control of the simultaneous write control means.

As a result, data read out from the external storage device can be written at the first address of the first memory, and when the first and second buses are connected by the bus connecting means, the simultaneous write control means writes the data read out from the external storage device at the converted second address of the second memory.

With the above arrangement, program data can be directly transferred from the external storage device to the second memory without going through the first memory.

FIGS. 2(a) and 2(b) respectively compare a conventional program data transfer method with a program data transfer method according to the present invention. In the conventional program data transfer method shown in FIG. 2(a), program data read out from disk device 6 is temporarily loaded in host memory 1, and is then transferred to interface memory 2. Blocks illustrated in host memory 1 and interface memory 2 represent memory spaces. Hatched portions are program data to be transferred. Program data transferred to host memory 1 is loaded in an upper address space starting from address "60000H" since it is not executed. Program data is loaded in interface memory 2 at a lower address space starting from address "00000H" since it is executed. In the program data transfer method of the present invention shown in FIG. 2(b), program data is transferred by simultaneous write access to host memory 102 and interface memory 202. Therefore, very high-speed program transfer can be achieved as compared to the conventional transfer method.

BRIEF DESCRIPTION OF THE DRAWINGS

Other objects and features of the present invention will be apparent from the following description taken in connection with the accompanying drawings, in which:

FIGS. 4(A)-4(L) are block diagrams for explaining the operation of the program data transfer apparatus shown in FIG. 3.

DETAILED DESCRIPTION OF THE PREFERRED EMBODIMENTS

Figure 3:
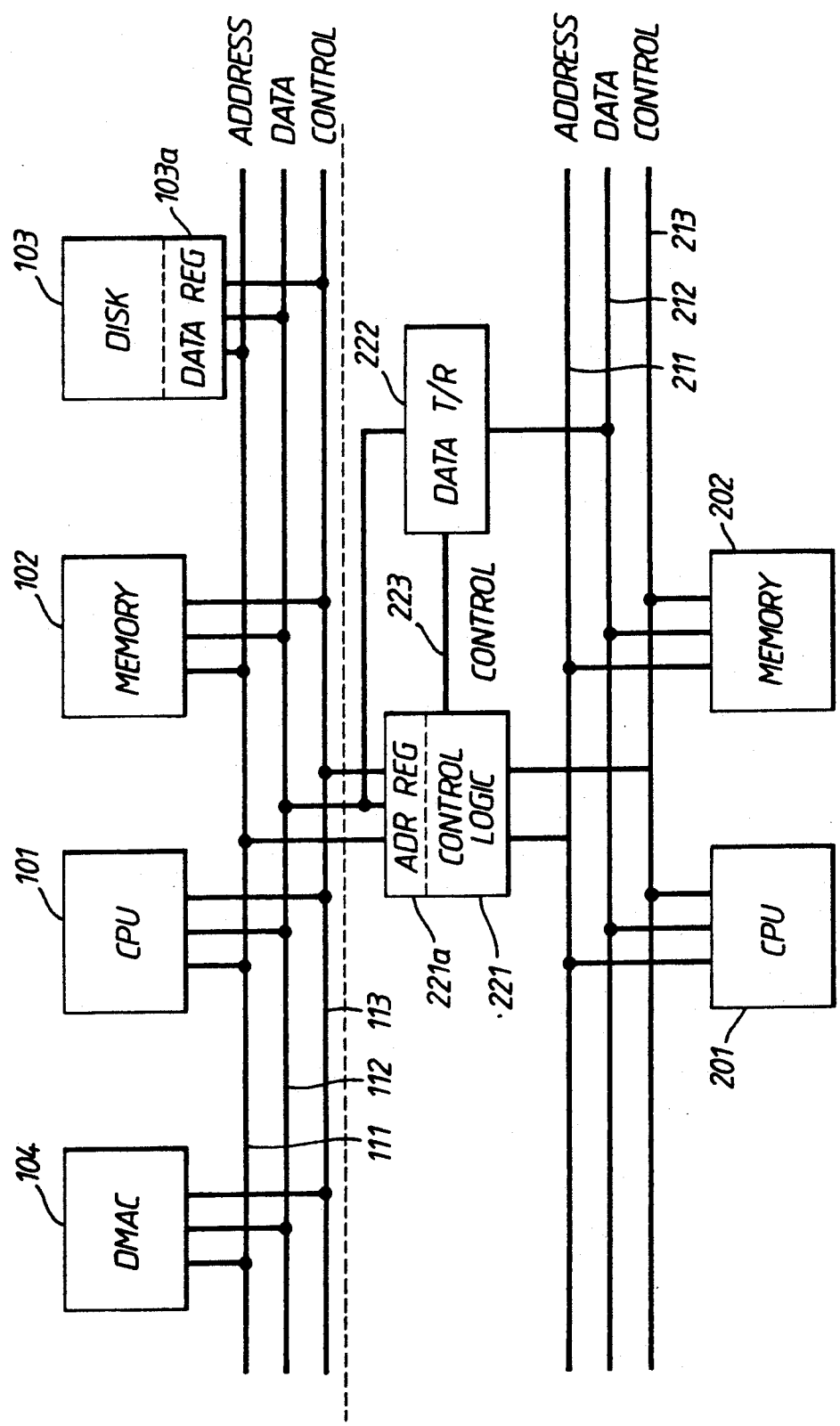
FIG. 3 is a block diagram of an embodiment of a program data transfer apparatus according to the present invention.
Figure 4A:
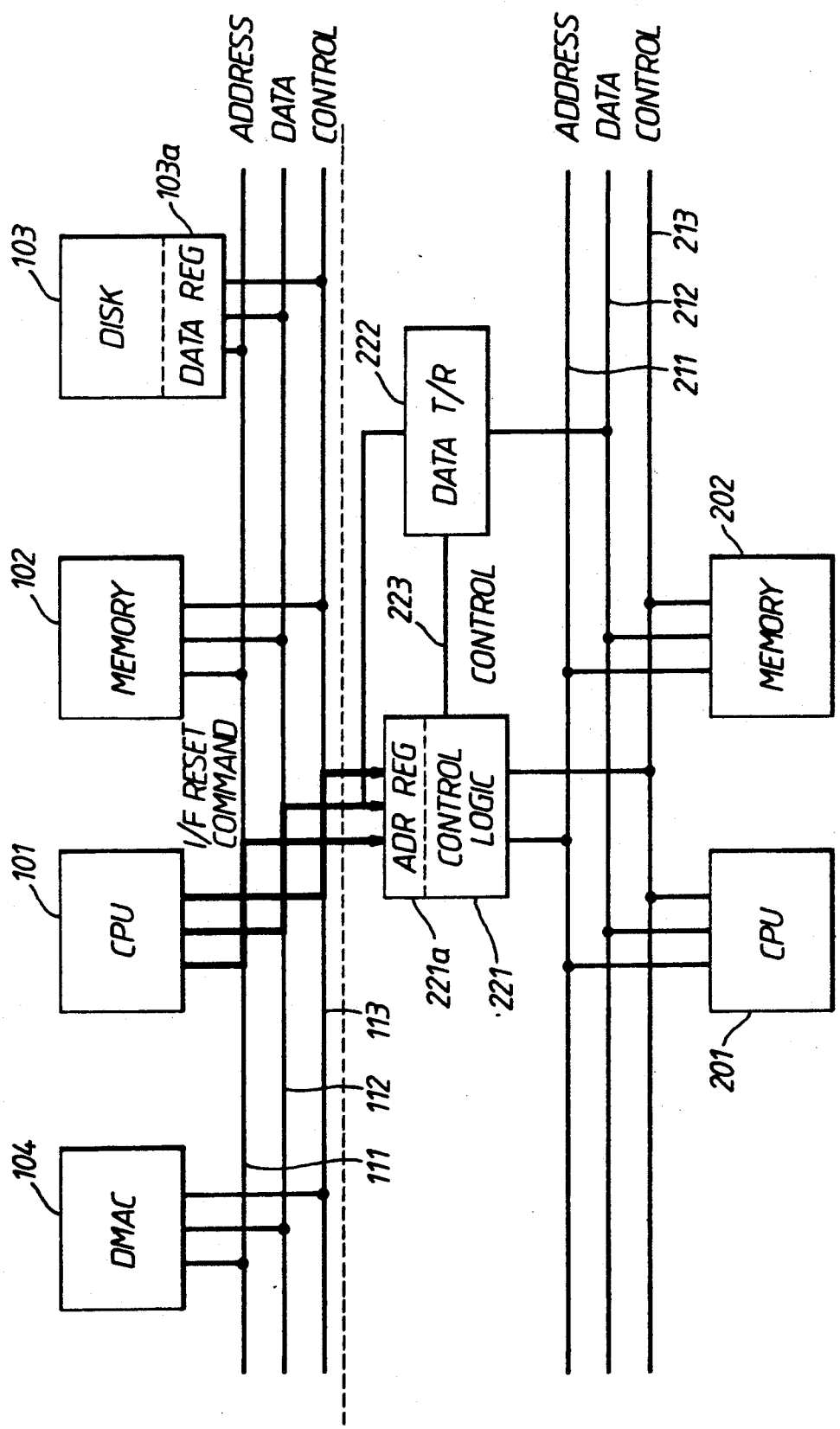
Figure 4B:
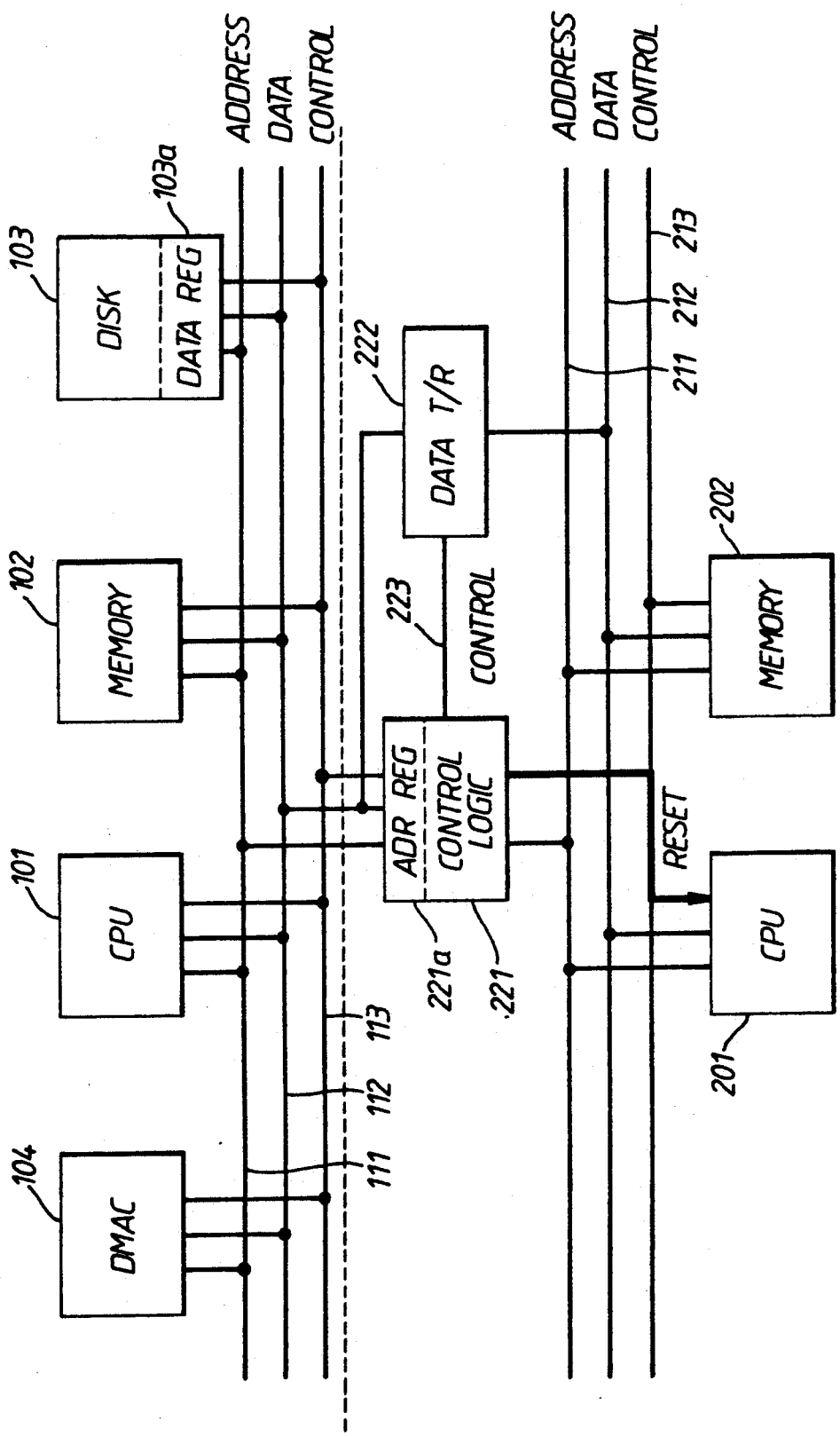
Figure 4D:
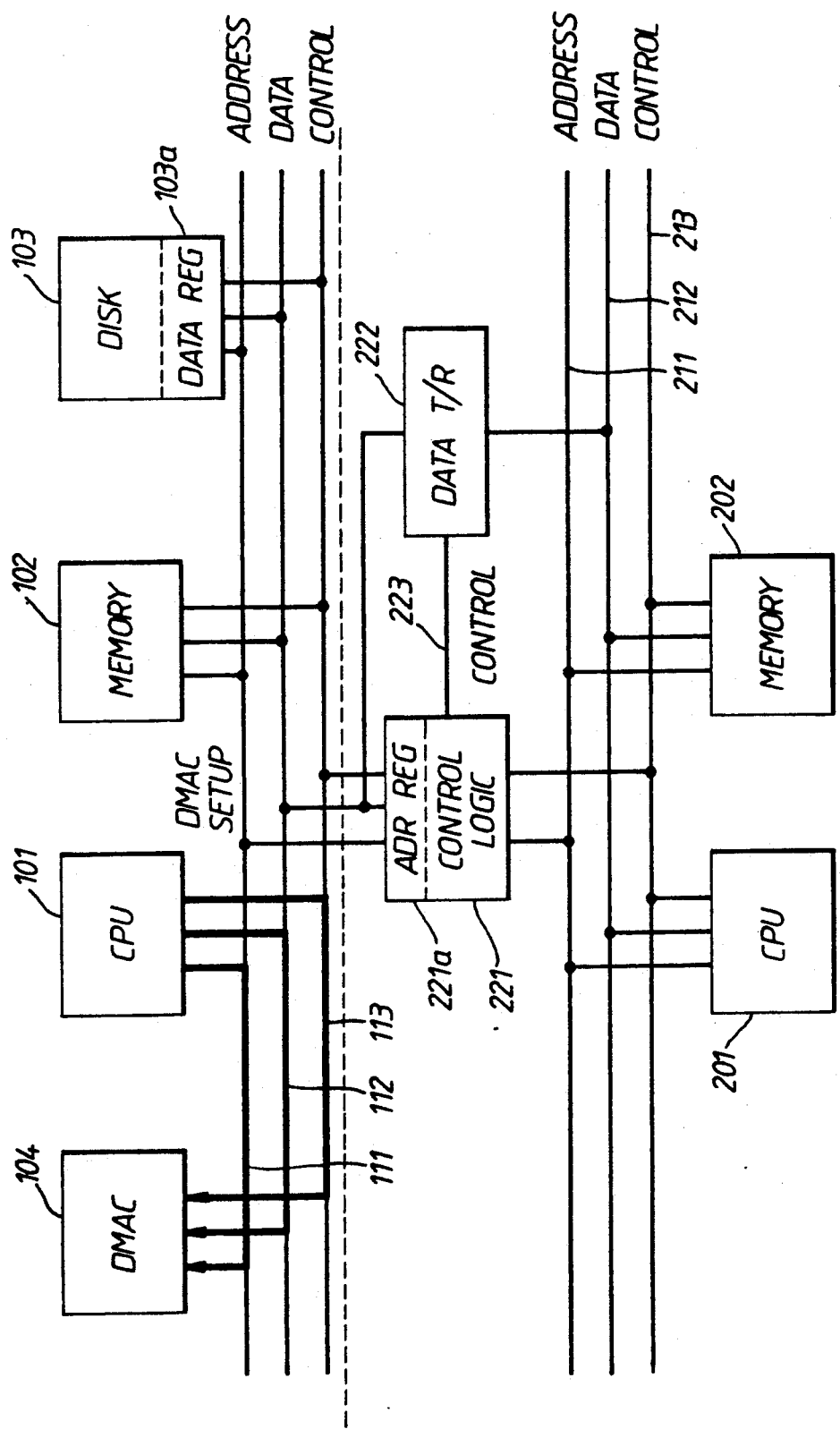
Figure 4D:
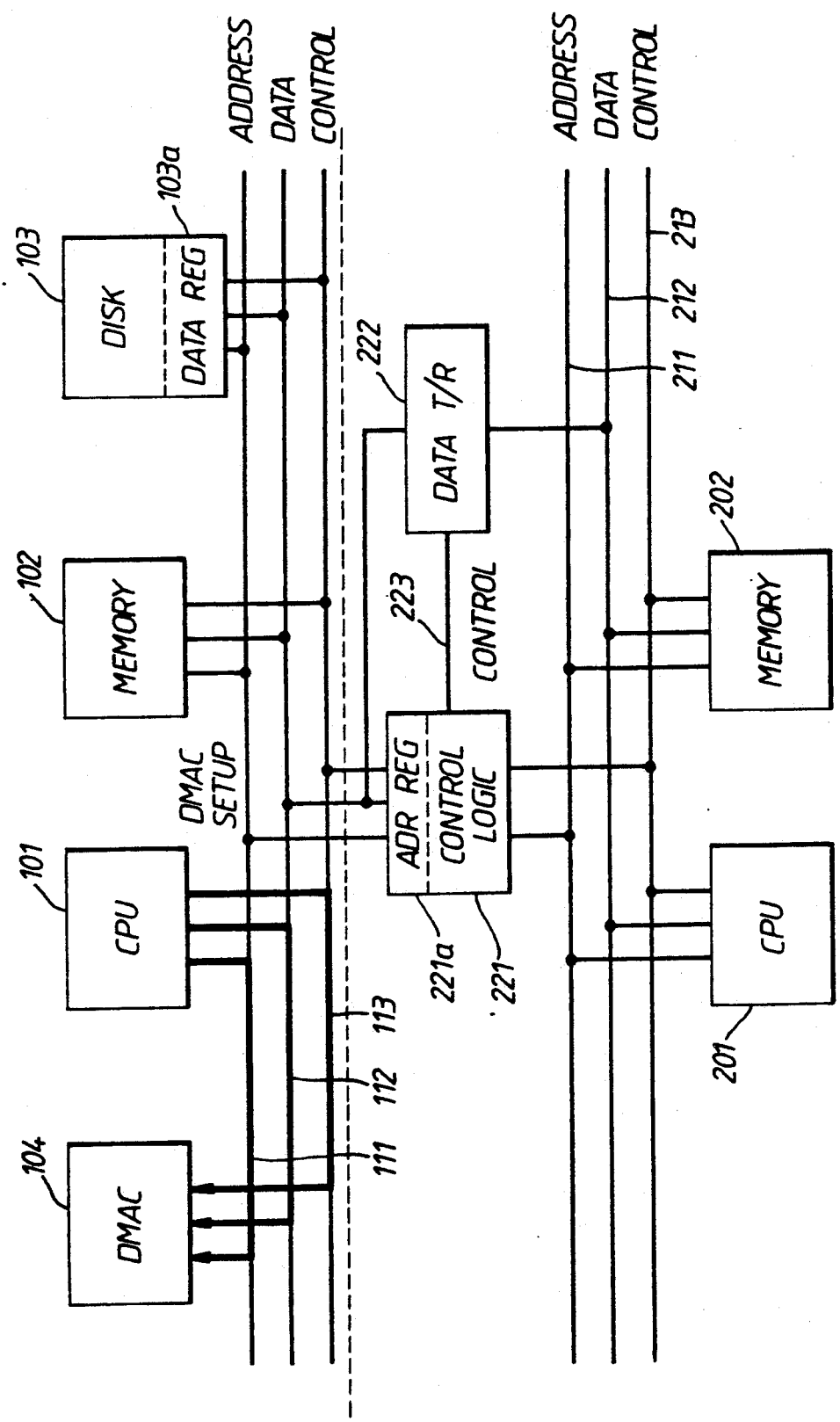
Figure 4E:
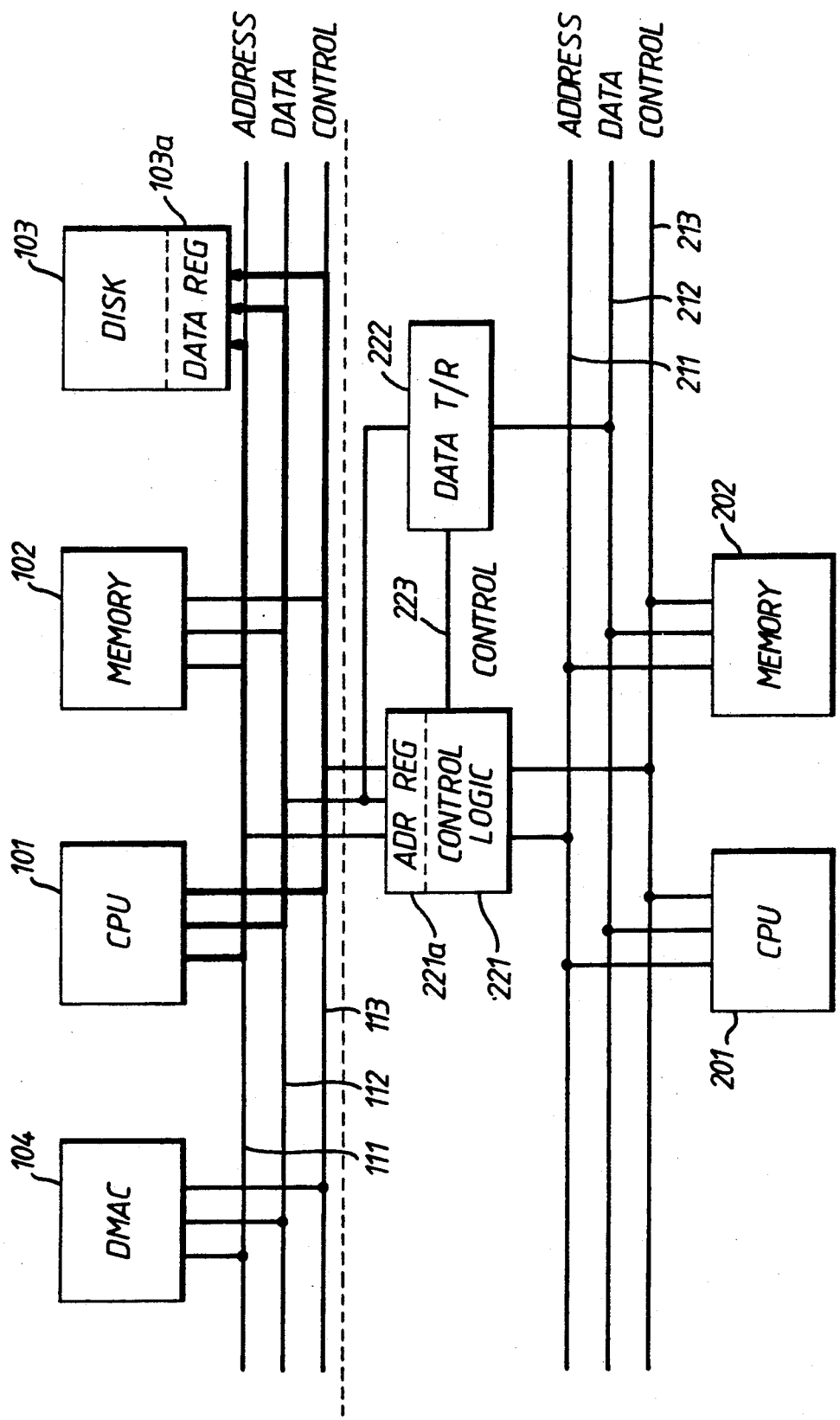
Figure 4F:
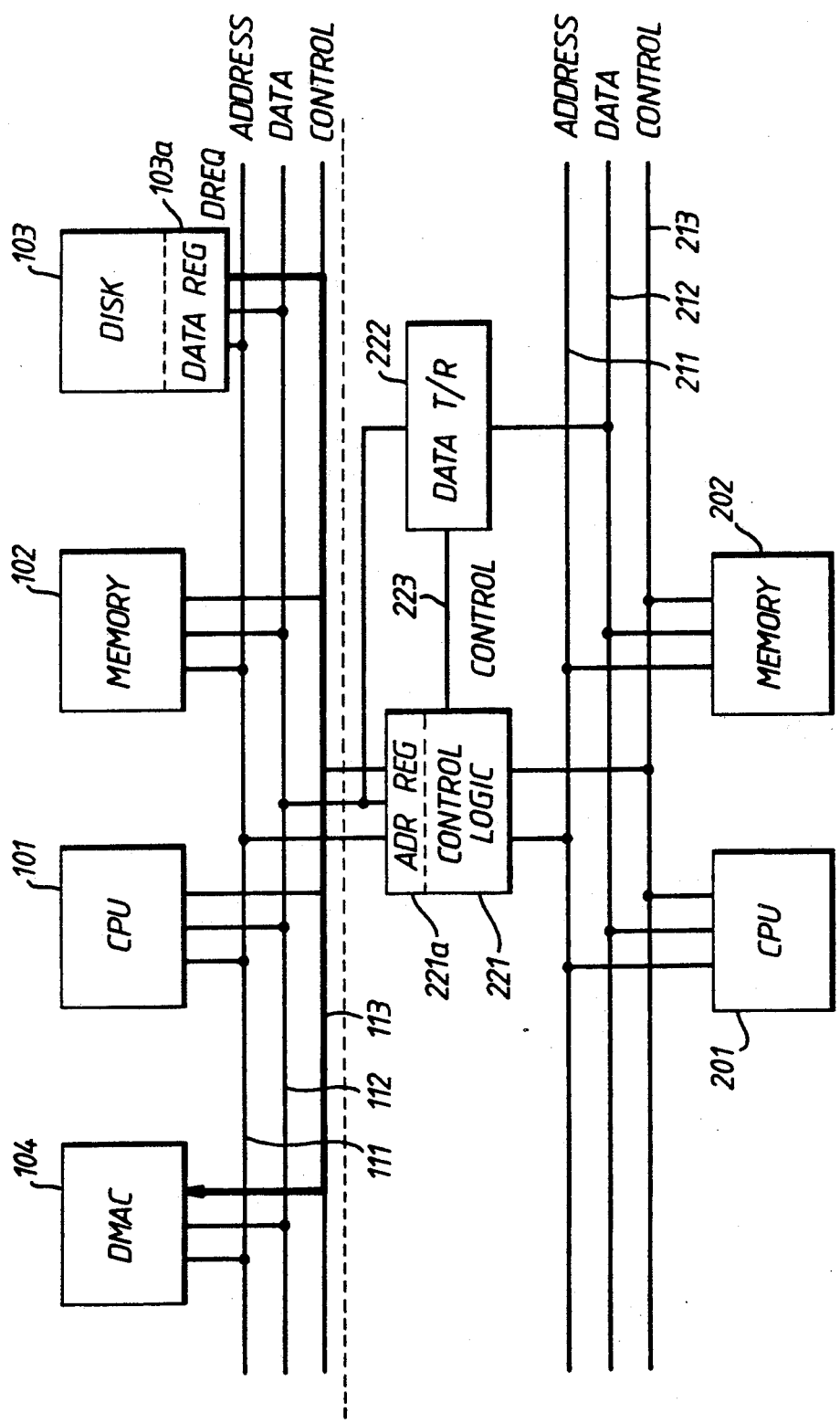
Figure 4G:
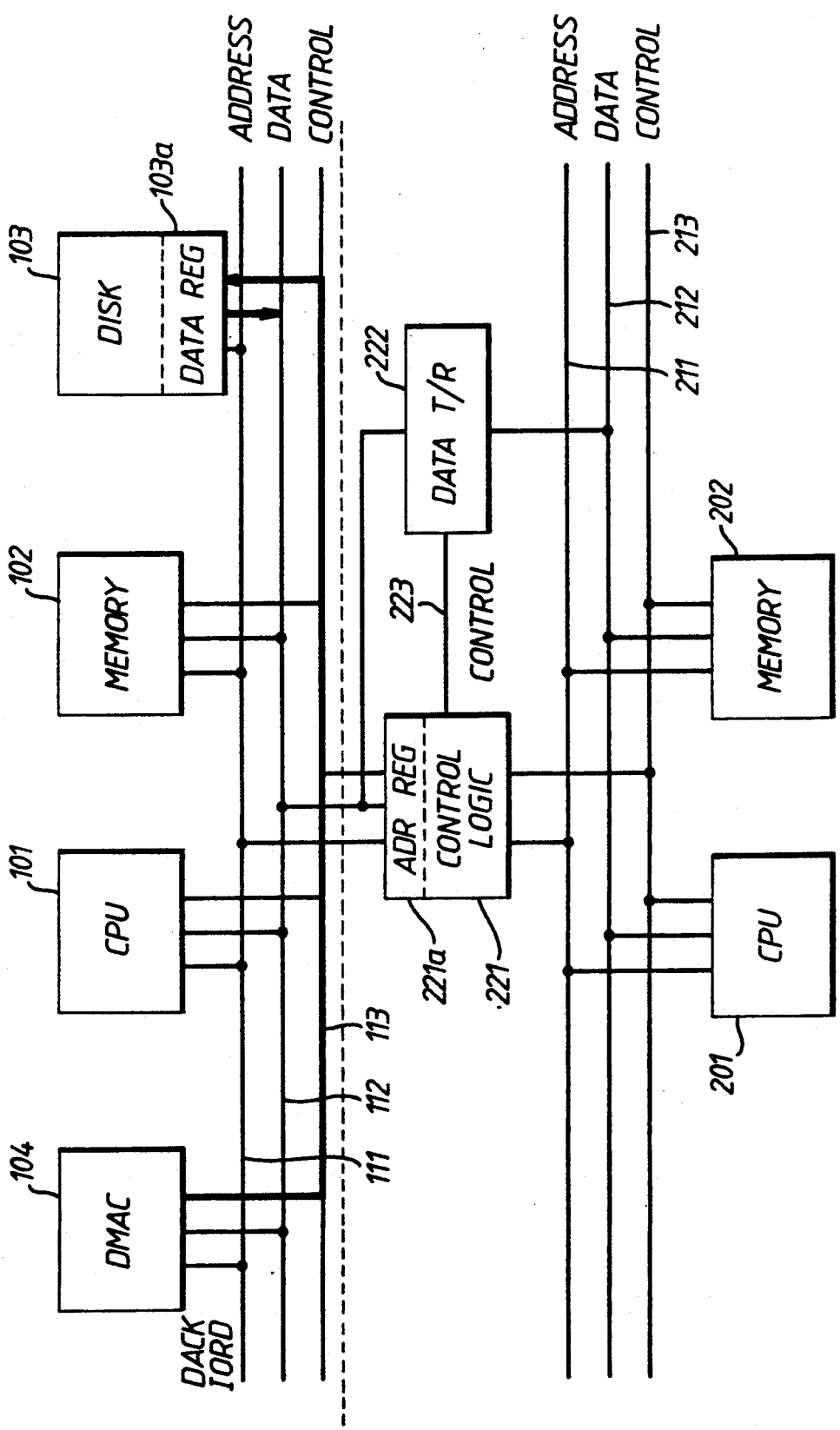
Figure 4H:
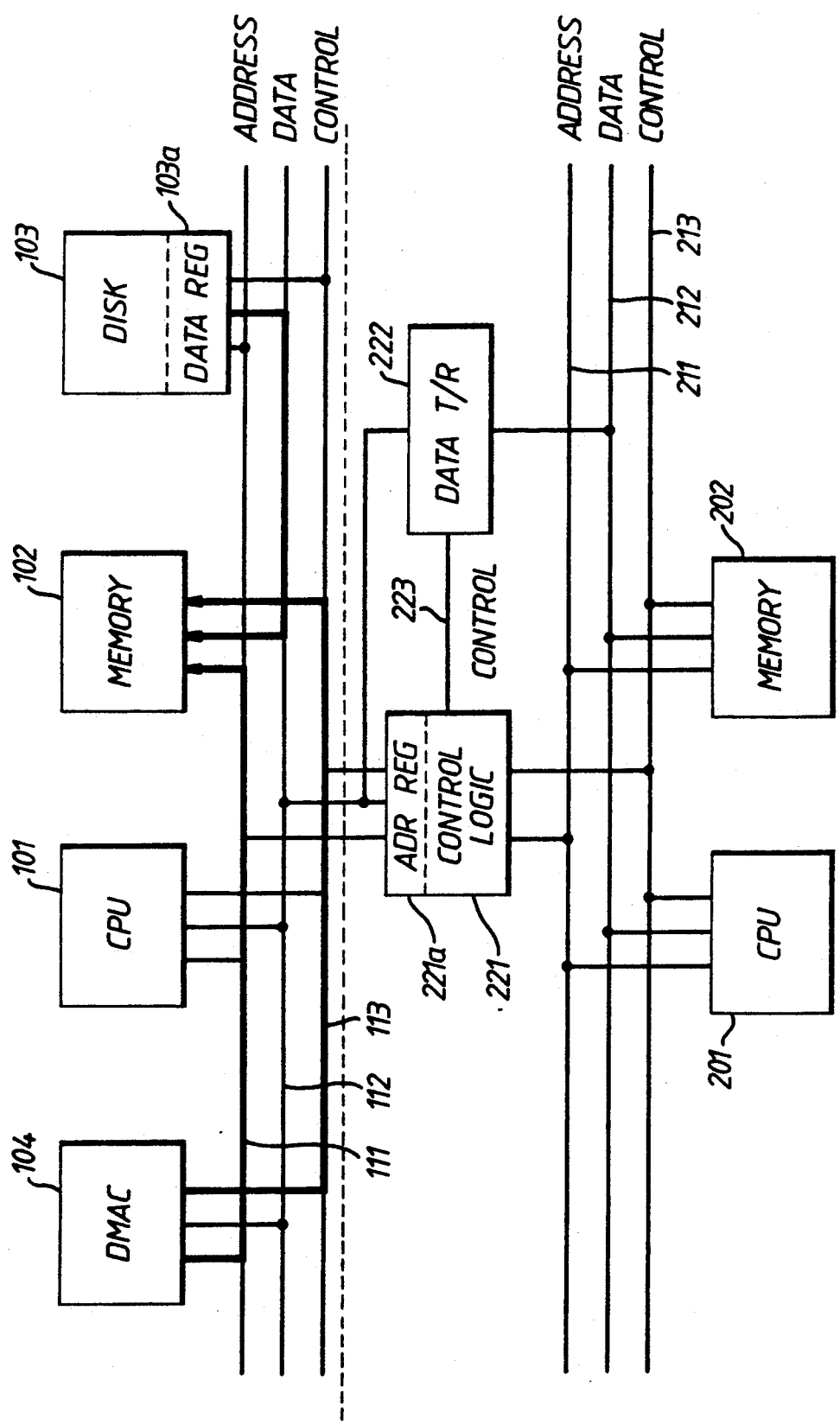
Figure 4I:
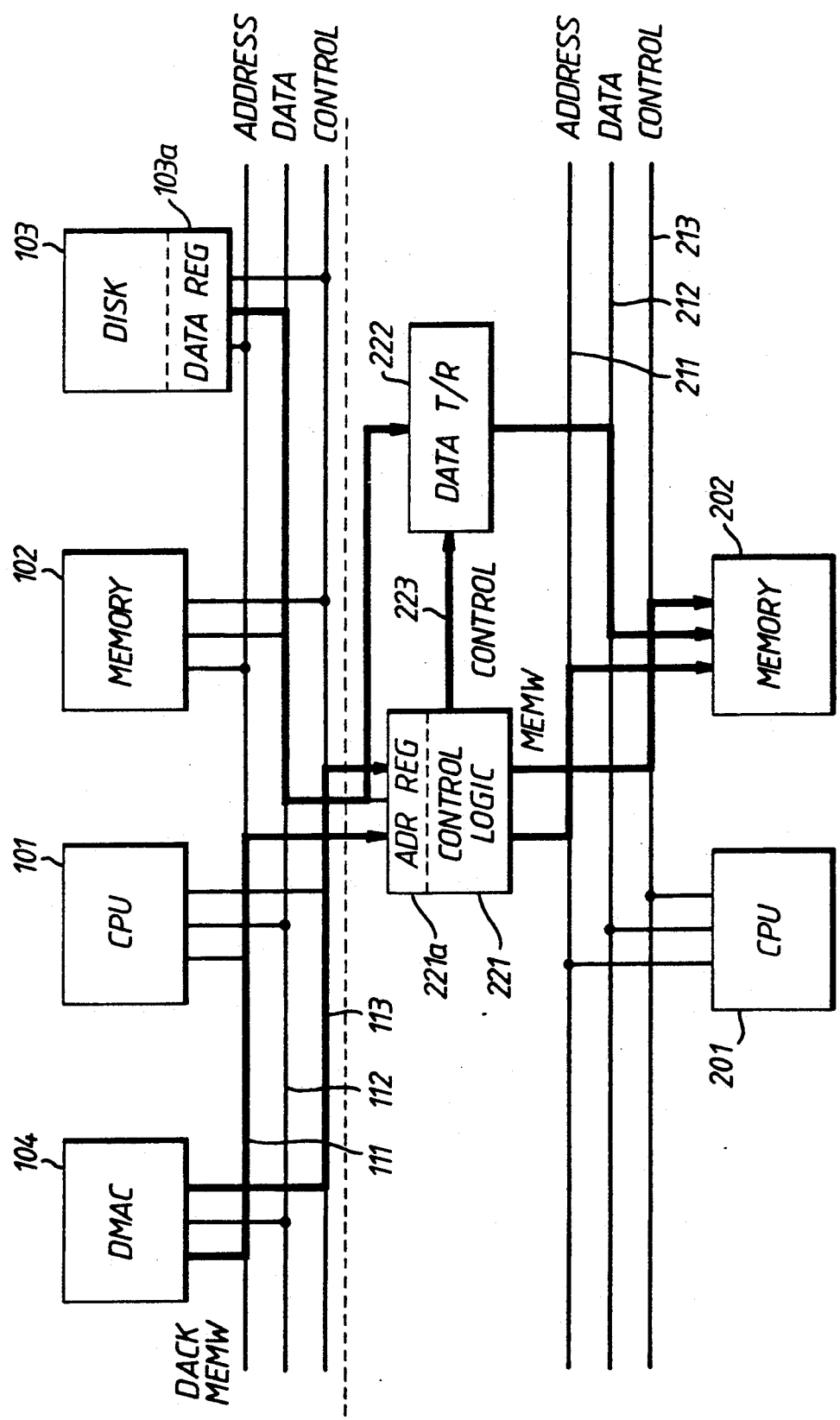
Figure 4J:
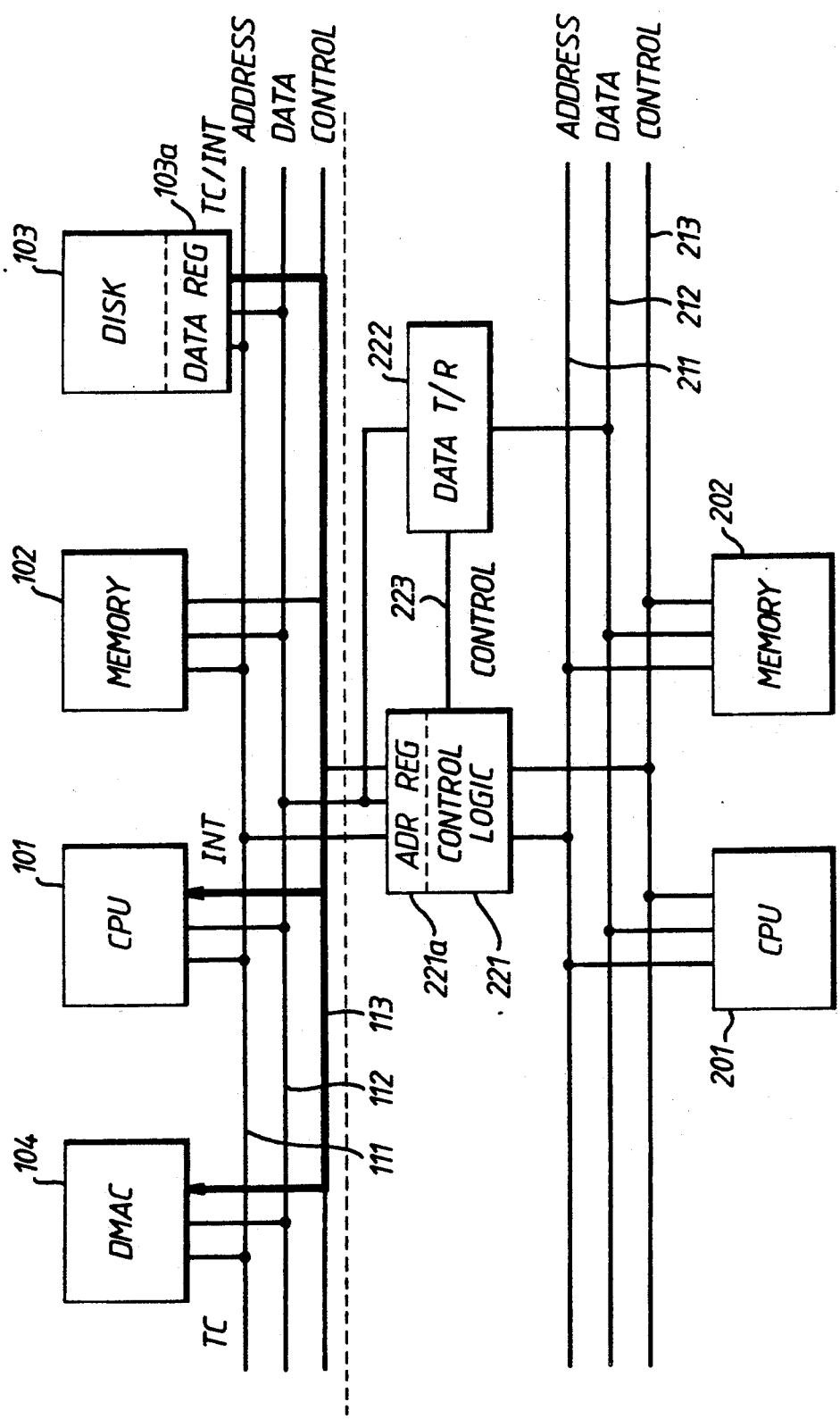
Figure 4K:
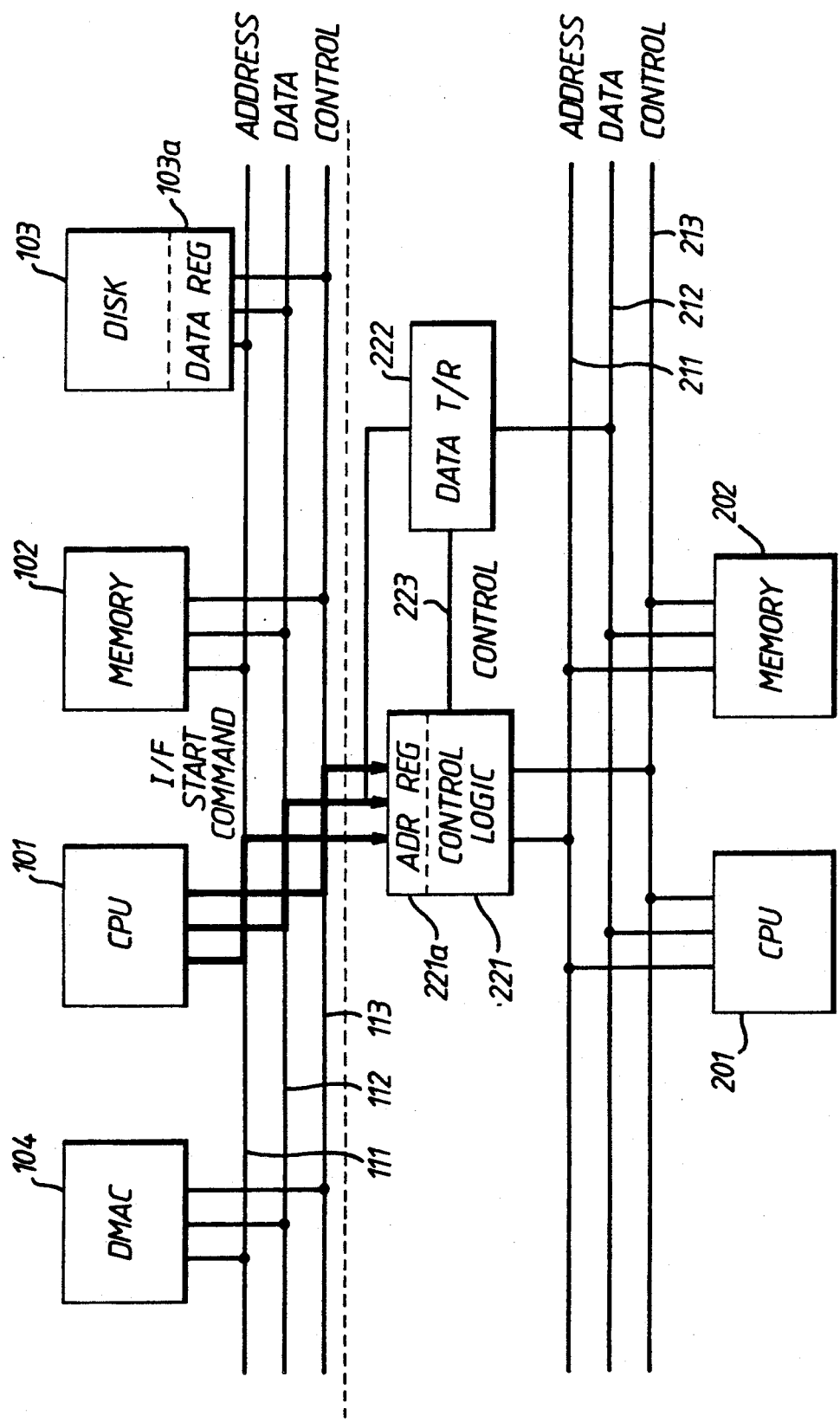
Figure 4L:
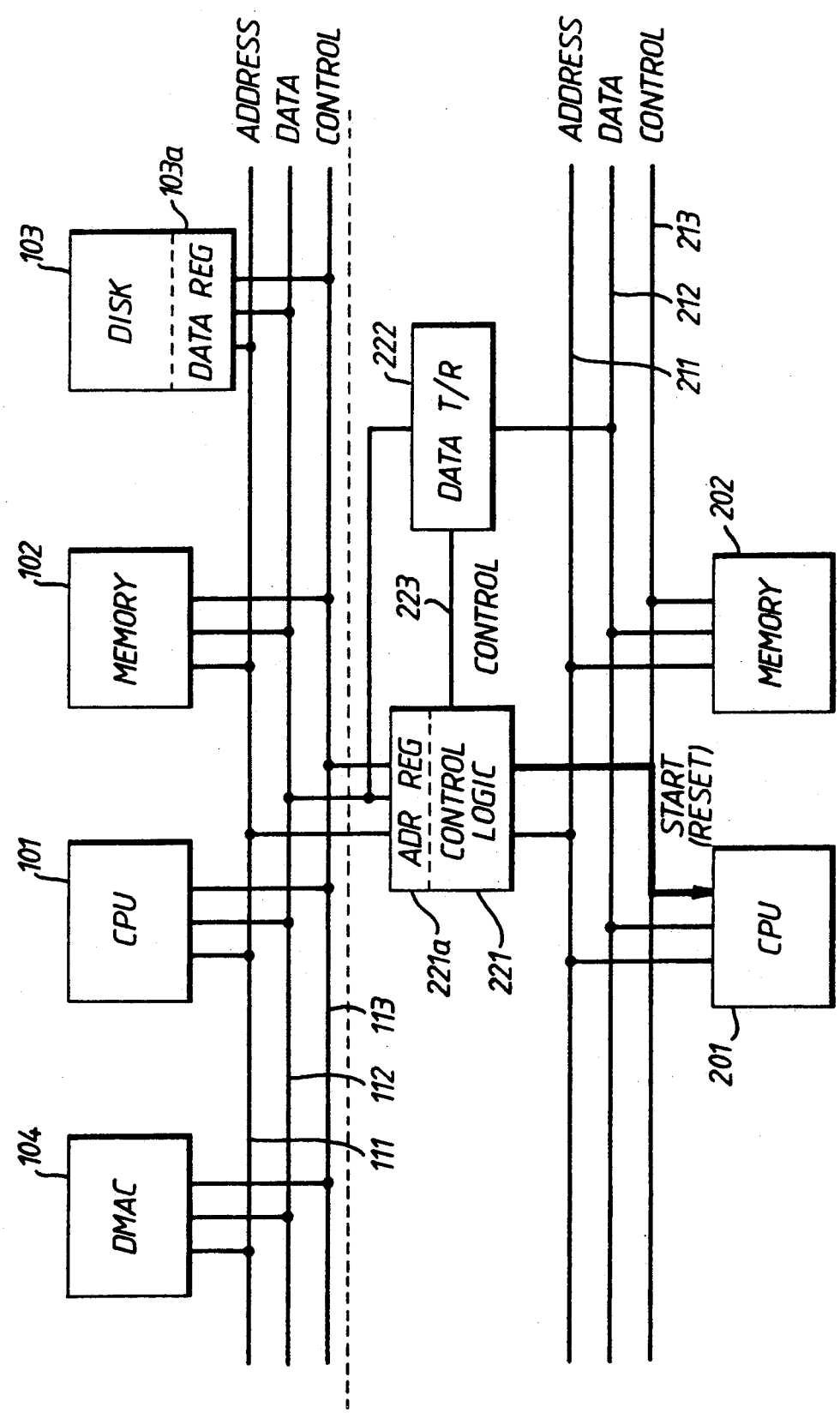

An embodiment of the present invention will be described hereinafter with reference to the accompanying drawings. FIG. 3 is a block diagram of an embodiment of a program data transfer apparatus according to the present invention. In FIG. 3, reference numerals 101 to 113 denote elements of a host device. A microprocessor 101 (to be referred to as a host CPU 101 hereinafter) controls the elements of the host device. A memory 102 (to be referred to as a host memory 102 hereinafter) is associated with host CPU 101. A disk device (DISK) 103, serves as an external storage device for storing programs and the like. Disk device 103 includes a data register 103a. The host device also includes a direct memory access controller (DMAC) 104. Elements 101-104 are all interconnected by an address bus 111, a data bus 112 and a command line 113.

Reference numerals 201 to 223 denote elements of an interface device. A microprocessor 201 (to be referred to as an interface CPU 201 hereinafter) controls, e.g., a LAN (Local Area Network). A memory 202 (to be referred to as an interface memory 202 hereinafter) is associated with interface CPU 201. Interface CPU 201 and interface memory 202 are interconnected by an address bus 211, a data bus 212 and a command line 213. Control logic 221 converts an address of host memory 102 into an address of interface memory 202, and controls the writing of data into host memory 102 and interface memory 202. Control logic 221 includes an address conversion register 221a. A difference (offset value) between addresses of host memory 102 and interface memory 202 is stored in address conversion register 221a. A data transceiver 222 selectively connects data bus 112 of the host device to data bus 212 of the interface device. Data transceiver 222 is enabled by a signal on enable line 223 generated by control logic 221.

FIGS. 4(A) to 4(L) are diagrams for explaining the above-mentioned operation of the embodiment along with the processing flow. In these Figures, cross-points indicating nodes are omitted, and signal lines subjected to data exchange in the corresponding process steps are illustrated as bold lines. FIGS. 5(A) to 5(F) are flow charts showing the operations of host CPU 101, disk device 103, DMAC 104, control logic 221, data transceiver 222, and interface CPU 201 of this embodiment.

The operation of the embodiment of the present invention will now be described with reference to FIGS. 2 to 5. Processing 1 (FIG. 4(A))

Figure 5A:
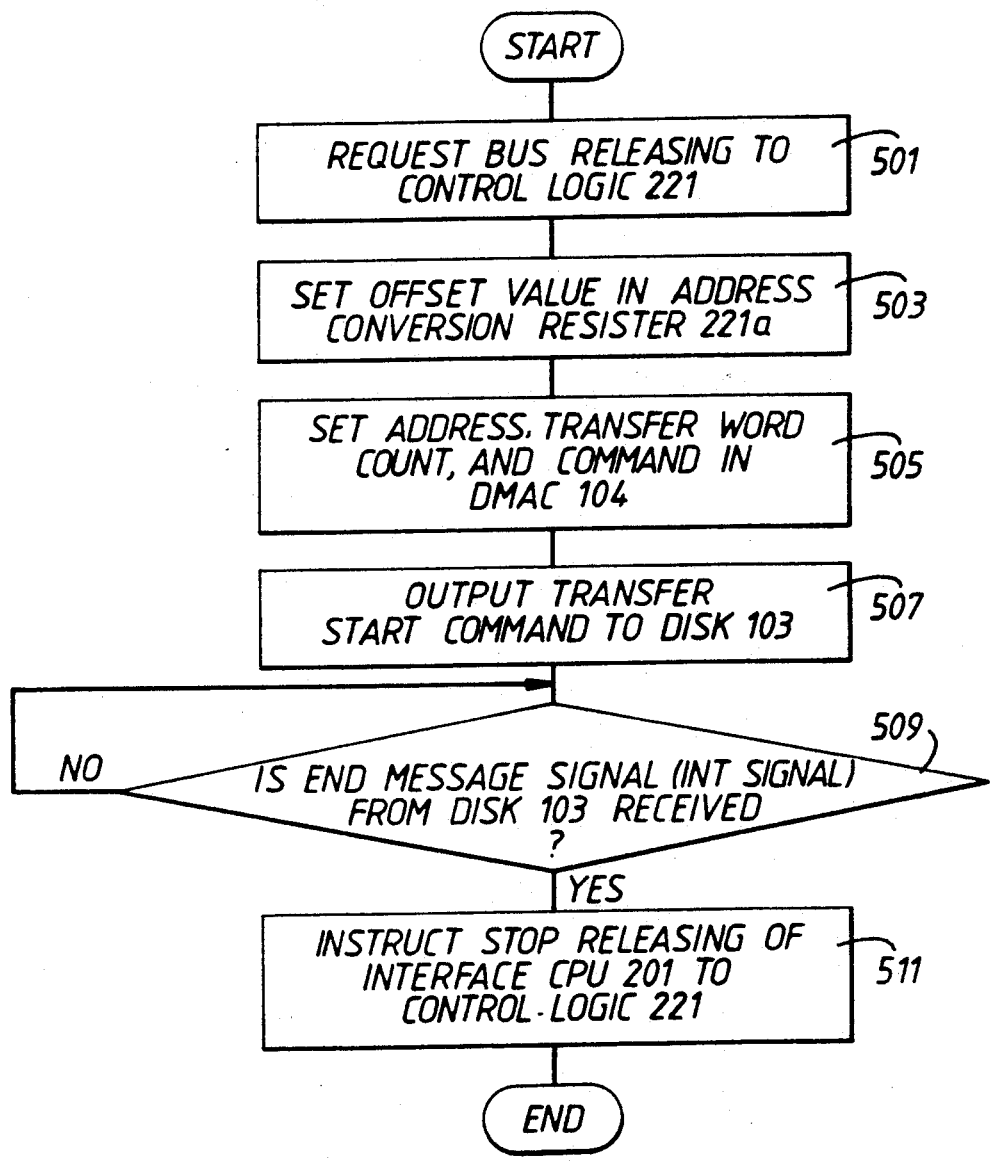
FIGS. 5(A)-5(F) are flow charts for explaining the operation of the program data transfer apparatus shown in FIG. 3.

Host CPU 101 supplies to control logic 221 a command that control logic 221 should cause interface CPU 201 to release buses 211, 212, and 213 of the interface device (step 501 in FIG. 5(A)). Processing 2 (FIG. 4(B))

Figure 5B:
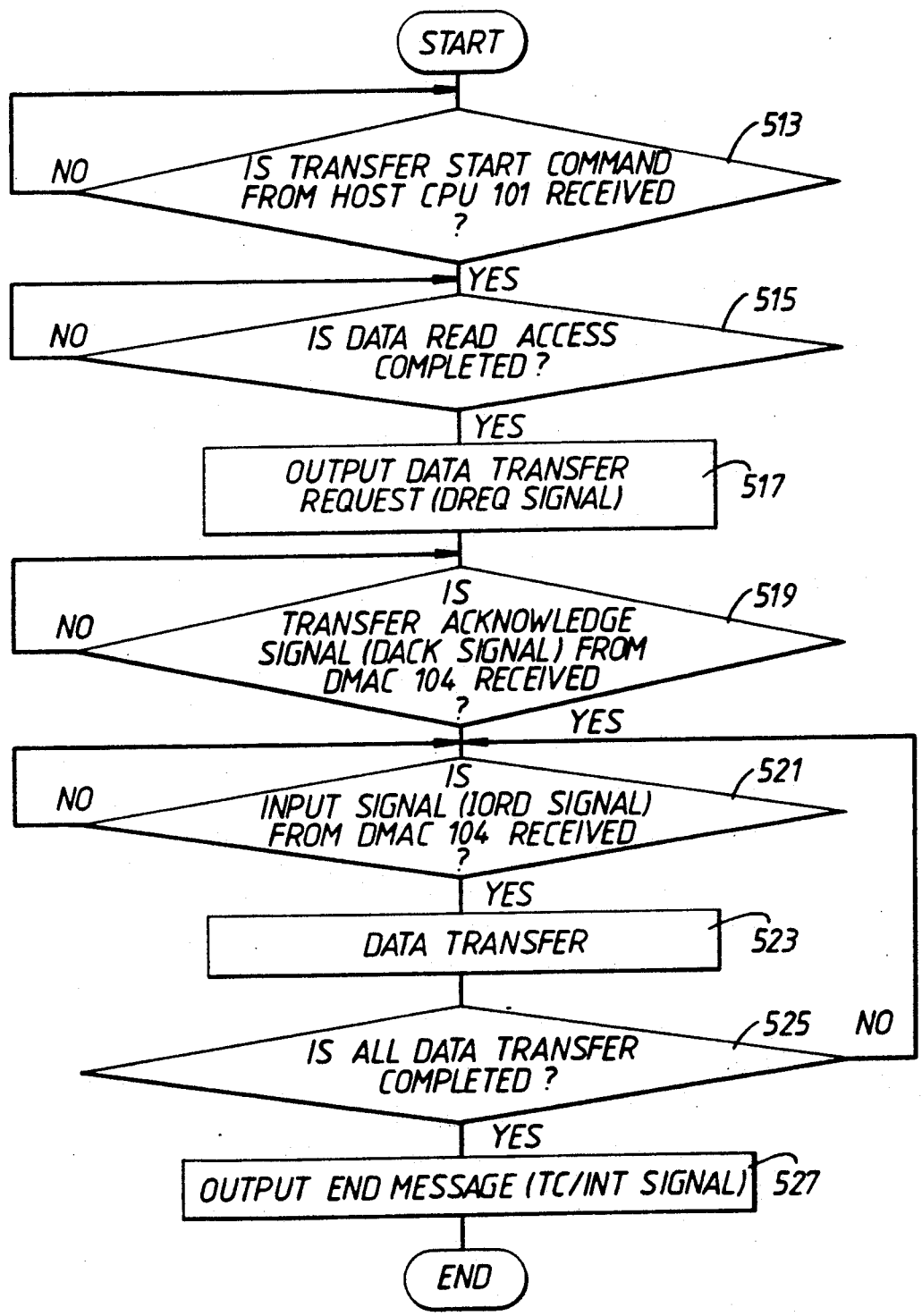
Figure 5C:
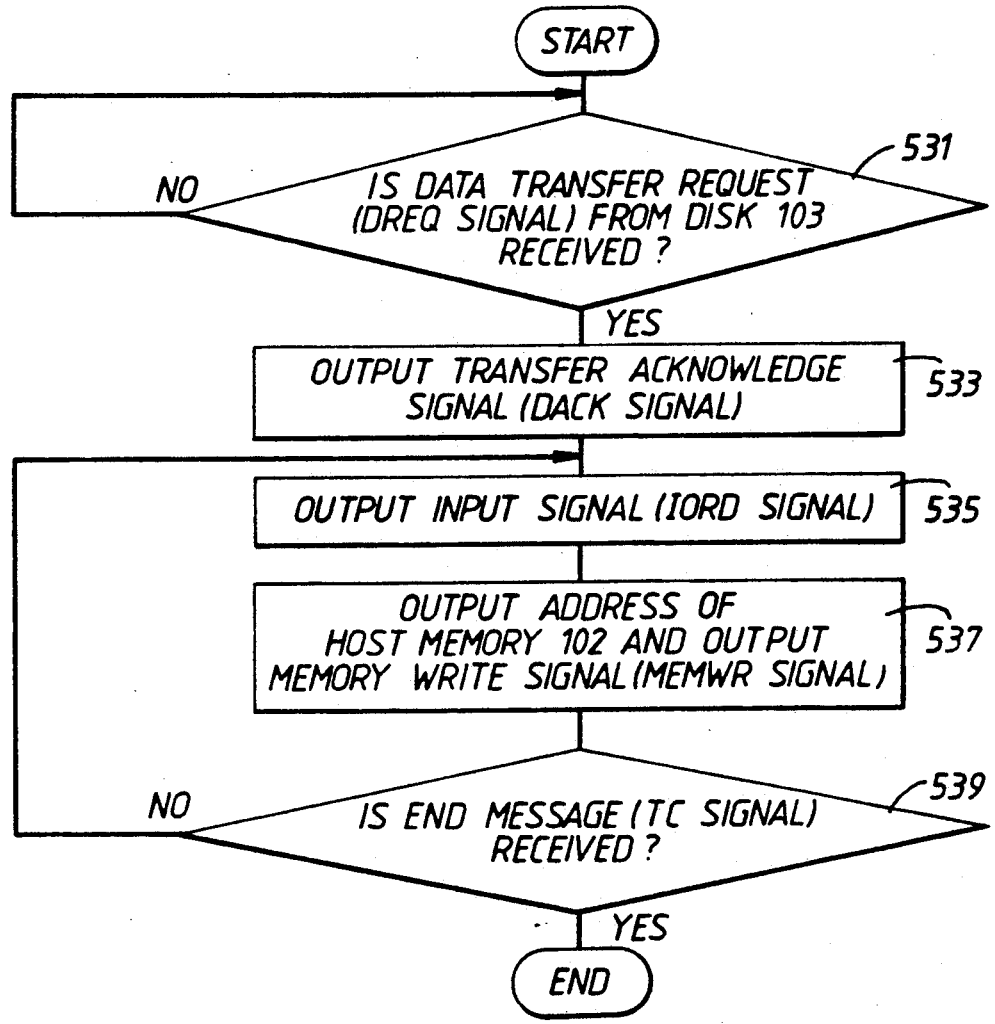
Figure 5D:
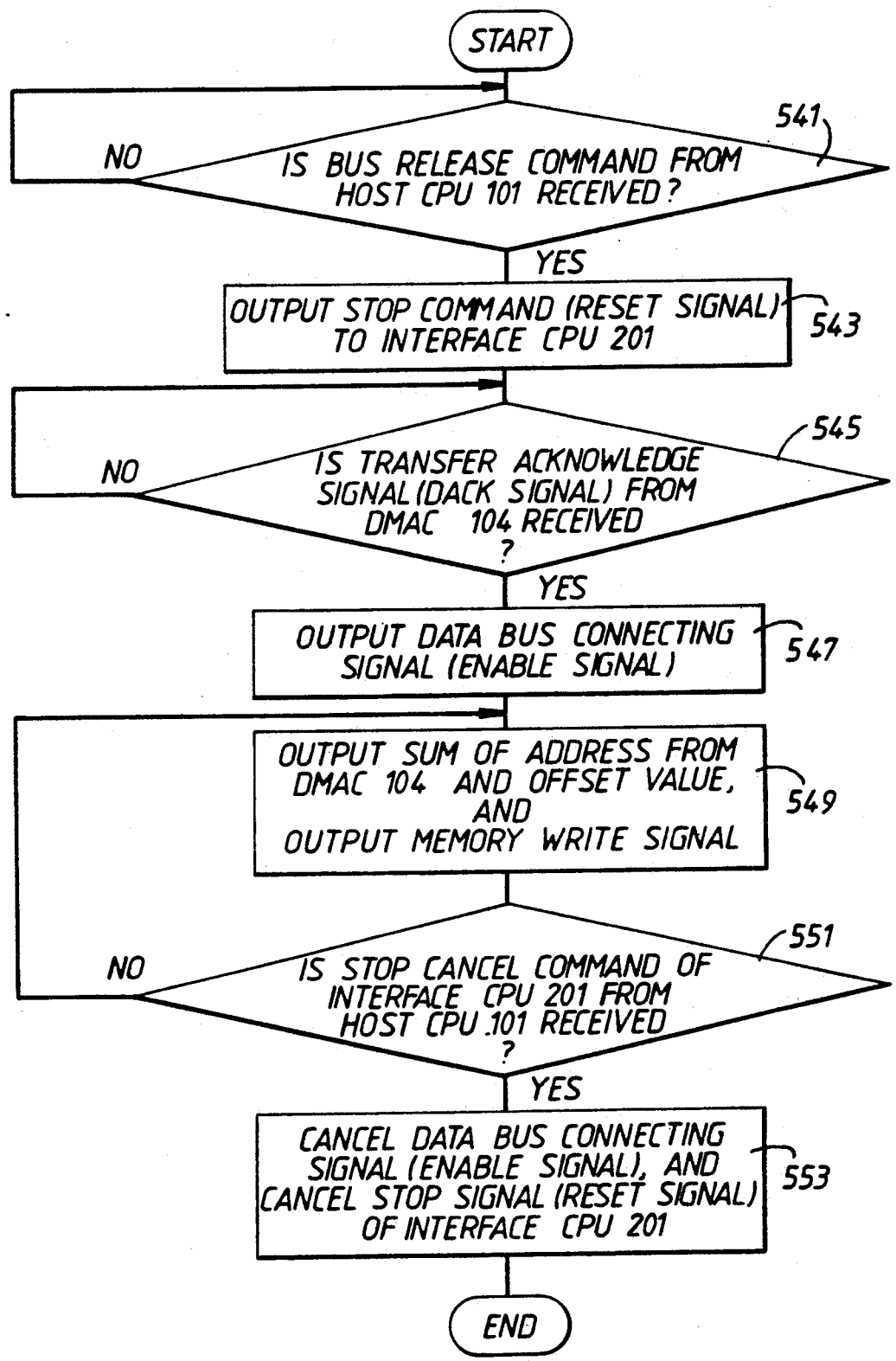
Figure 5E:
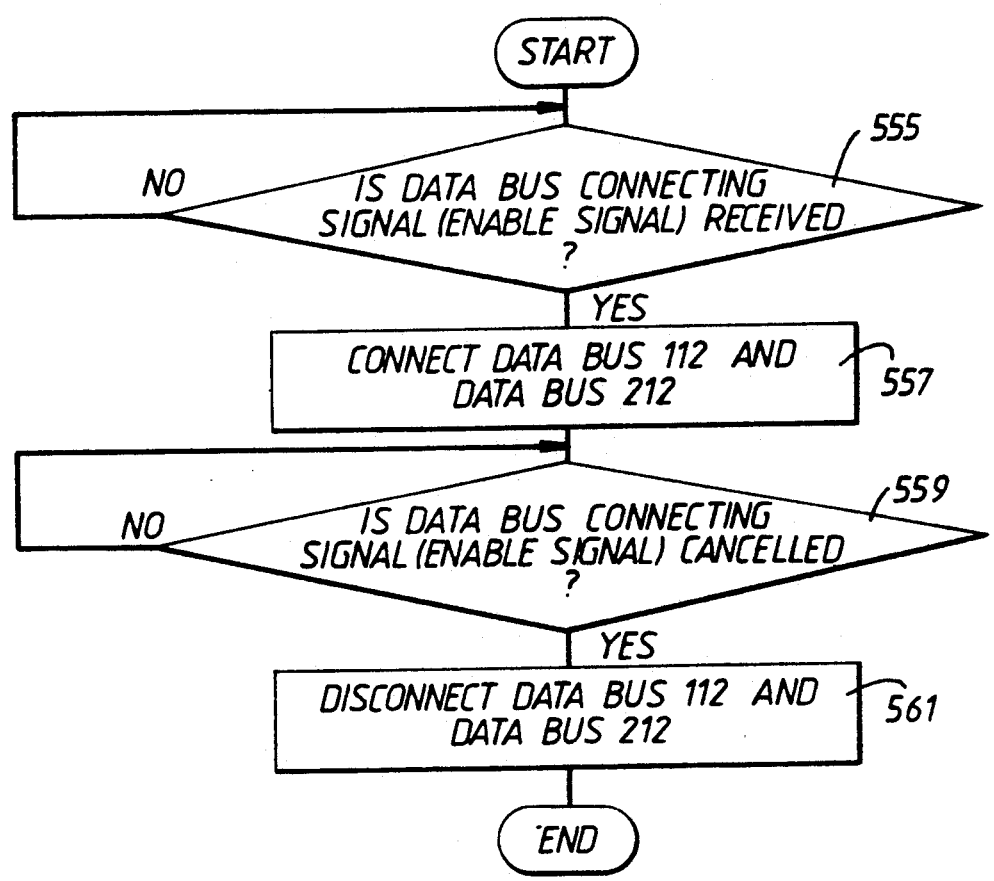
Figure 5F:
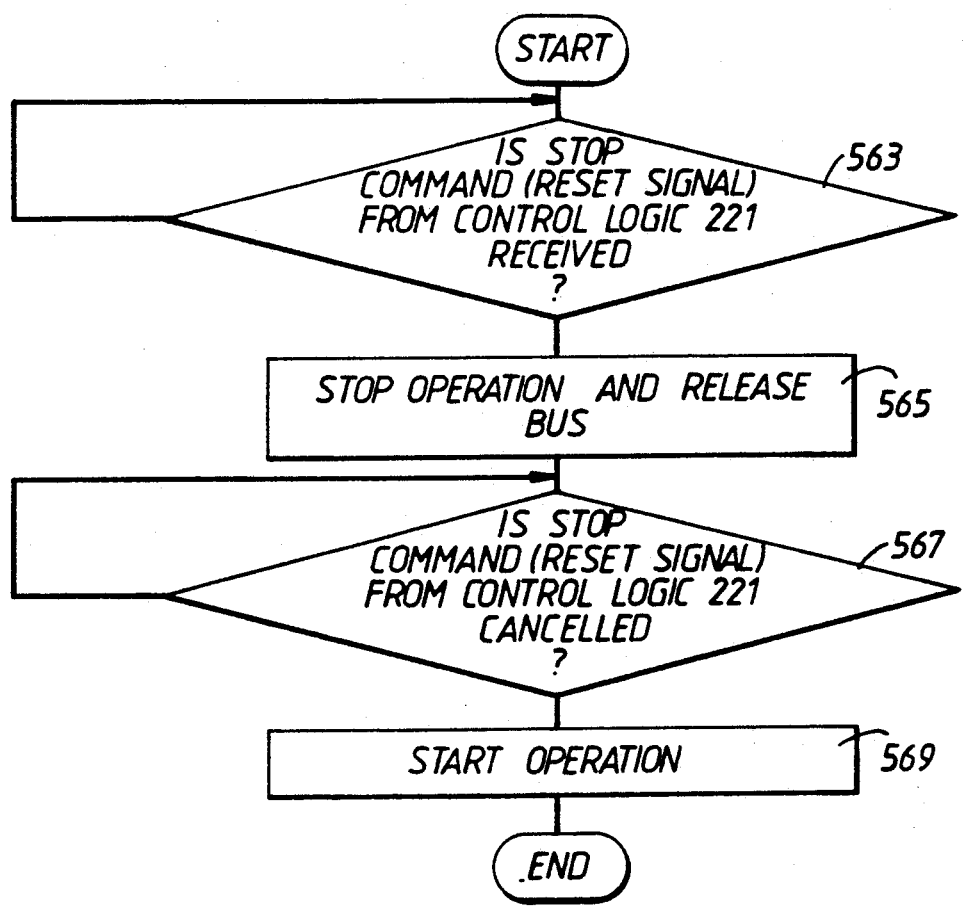

Control logic 221 sends on command line 213 a signal (RESET signal) for stopping interface CPU 201 (or a device serving as a bus master, not shown) (steps 541 and 543 in FIG. 5(D)). Interface CPU 201 receives the RESET signal, and stops its operation to release buses 211, 212, and 213 (steps 563 and 565 in FIG. 5(F)).

With this processing, data transfer to interface memory 202 is enabled. Processing 3 (FIG. 4(C), FIG. 2(b))

Figure 1:
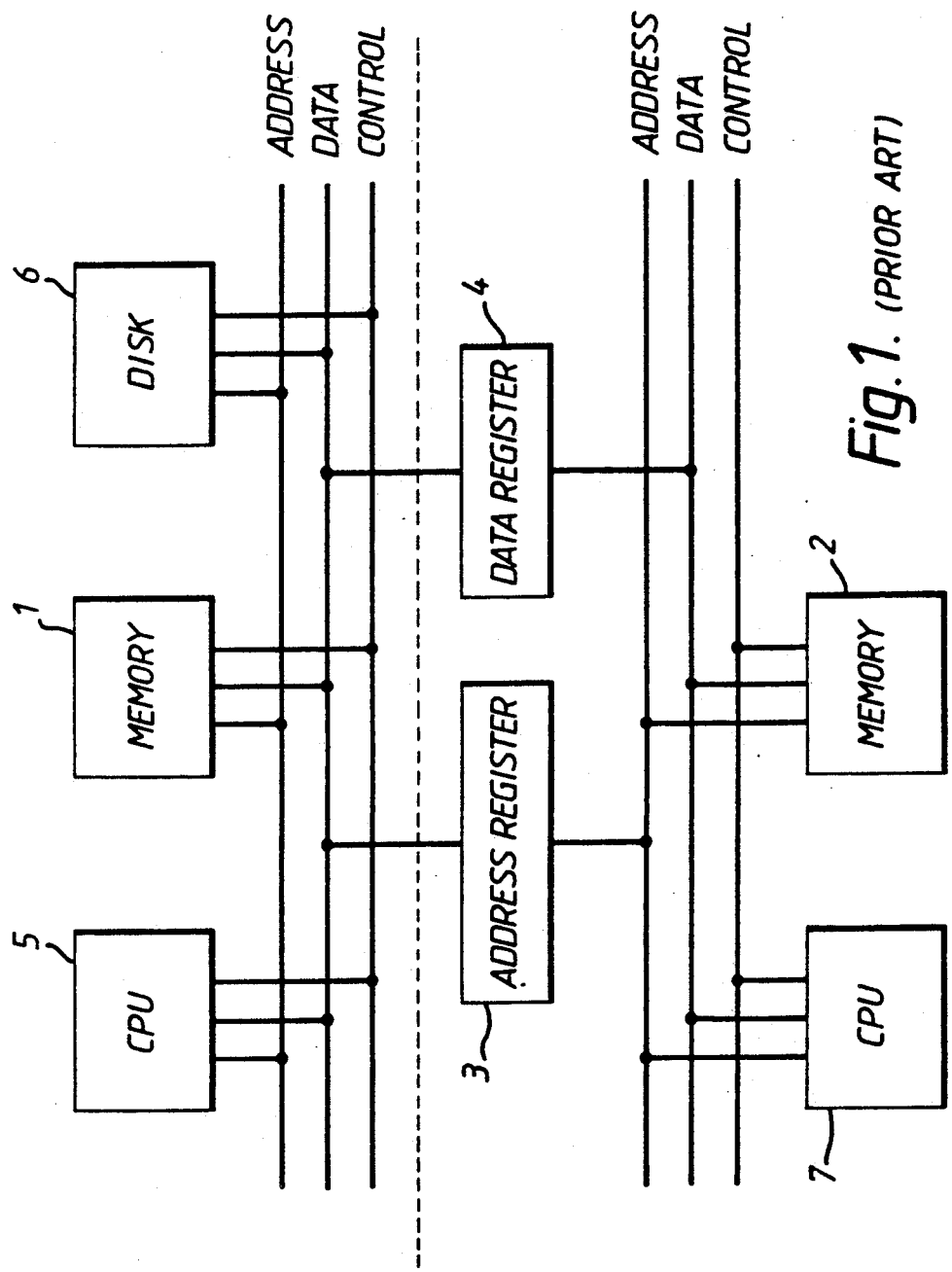
FIG. 1 is a block diagram of a conventional program data transfer apparatus.
Figure 2B:
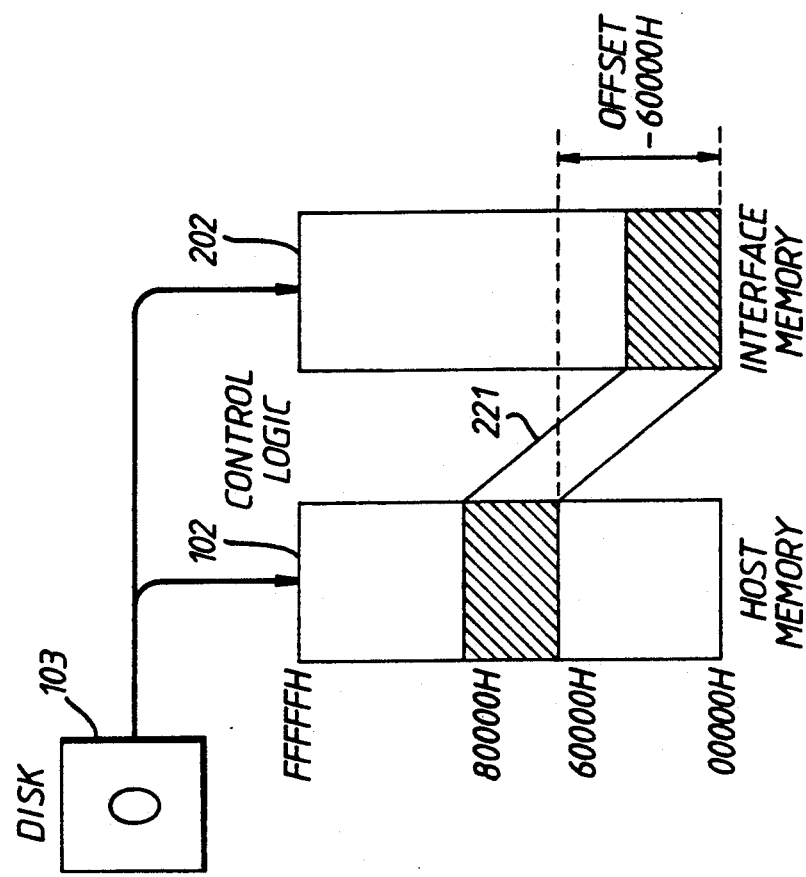
FIGS. 2(a) and 2(b) are diagrams respectively comparing a conventional program data transfer apparatus with a program data transfer apparatus of the present invention.
Figure 2A:
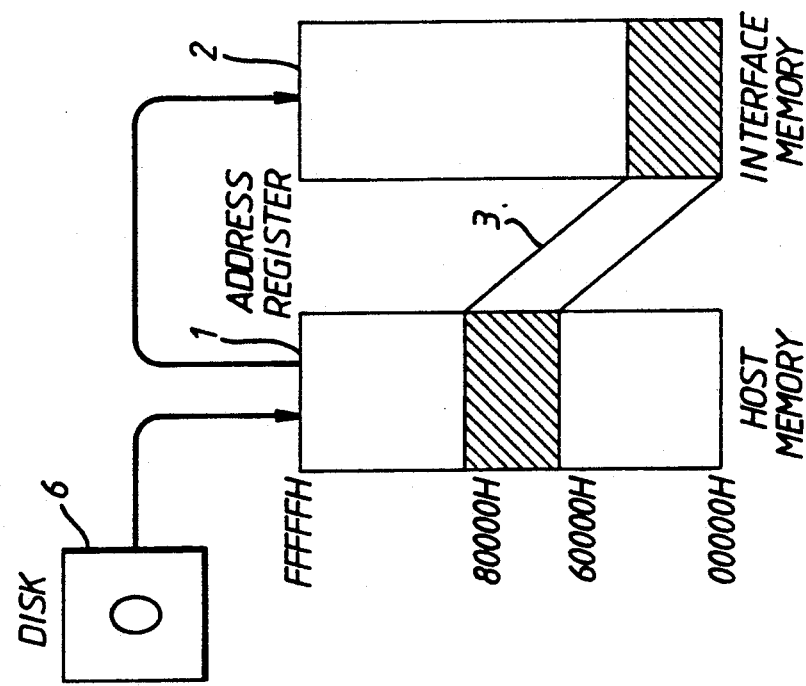

Host CPU 101 stores in address conversion register 221a a difference (offset value) between an address of host memory 102 and an address of interface memory 202 into which the program data is to be loaded (step 503 in FIG. 5(A)). In FIG. 2(b), the program data is to be loaded in host memory 102 from address "60000H", while it is to be loaded in interface memory 202 from address "00000H". Therefore, the offset value is "−60000H". Processing 4 (FIG. 4(D))

Host CPU 101 stores in a channel of DMAC 104 to which disk device 103 is connected an address of host memory 102 at which data is to be loaded, a count of the number of words (or bytes) to be transferred, and commands necessary for setting up a direct memory transfer (step 505 in FIG. 5(A)). Processing 5 (FIG. 4(E))

Host CPU outputs a transfer start command to disk device 103 (step 507 in FIG. 5(A)). The transfer start command includes information indicating data to be read out. Processing 6 (FIG. 4(F))

Disk device 103 receives the transfer start command from host CPU 101, reads out data, and sets the readout data in data register 103a. Then, disk device 103 outputs onto command line 113 a transfer request signal (DREQ signal) (steps 513 to 517 in FIG. 5(B)). Processing 7 (FIG. 4(G))

When DMAC 104 receives the DREQ signal from disk device 103, it outputs onto command line 113 an acknowledge signal (DACK signal) indicating that the transfer request is accepted (steps 531 and 533 in FIG. 5(C)). DMAC 104 then outputs onto command line 113 a signal (IORD signal) for urging a data read access (step 535 in FIG. 5(C)). The IORD signal is output every predetermined read unit (e.g., word unit or byte unit).

When disk device 103 receives the DACK signal and the IORD signal, it sends the program data set in data register 103a onto data bus 112 (steps 519 to 523 in FIG. 5(B)). Processing 8 (FIG. 4(H))

DMAC 104 outputs onto address bus 111 an address of host memory 102 at which the program data is to be written, simultaneously with the output of program data from disk device 103, and also outputs onto command line 113 a memory write signal (MEMW signal) (step 537 in FIG. 5(C)).

Thus, data from data register 103a can be written in host memory 102 at the address output from DMAC 104.

Up to this point, program data has been written in host memory 102. Processing for writing the program data in interface memory 202 will be described below. The writing of program data in interface memory 202 is performed in parallel with the writing of the same data in host memory 102. Processing 9 (FIG. 4(I))

When control logic 221 receives the DACK signal output from DMAC 104, it outputs onto enable line 223 a data bus connecting signal (ENABLE signal) (step 547 in FIG. 5(D)). Upon reception of the ENABLE signal, data transceiver 222 connects data bus 212 of the interface device to data bus 112 of the host device (steps 555 and 557 in FIG. 5(E)). Control logic 221 fetches the address on address bus 111 of the host device, adds the offset value held in address conversion register 221a to the fetched address, and outputs the converted address onto address bus 211 of the interface device. Control logic 221 also outputs an MEMW signal onto command line 213 of the interface device (step 549 in FIG. 5(D)).

With this operation, the program data in data register 103a of disk device 103 is transferred to interface memory 202 through data bus 112 of the host device, data transceiver 222, and data bus 212 of the interface device, and is written in interface memory 202 in accordance with the converted address output from control logic 221.

- Processing steps 6 to 9 are repetitively executed to transfer program data. Processing 10 (FIG. 4(J))

When transfer of the program data is completed, disk device 103 outputs onto command line 113 an end message signal (TC/INT signal) (steps 525 and 527 in FIG. 5(B)). Signal TC is a message for DMAC 104, and signal INT is a message for host CPU 101. Processing 11 (FIG. 4(K))

Upon reception of the INT signal, host CPU 101 outputs to control logic 221 a command to cause control logic 221 to allow interface CPU 201 to resume processing(steps 509 and 511 in FIG. 5(A)). Upon reception of the TC signal, DMAC 104 stops its operation (step 539 in FIG. 5(C). Processing 12 (FIG. 4(L)) .

Control logic 221 receives the stop cancel signal from host CPU 101, cancels the stop signal (RESET signal) to interface CPU 201, and cancels the data connecting signal (ENABLE) to data transceiver 222 (steps 551 and 553 in FIG. 5(D)).

In this manner, program data transfer is completed.

With the above-mentioned program data transfer processing, since program data can be directly transferred from disk device 103 to interface memory 202, the program data can be transferred without any wasteful operation. In this case, since data can be transferred without control of interface CPU 201, the interface device need not have a ROM for storing an IPL (initial program loader) or the like, and hence, its hardware arrangement can be simplified.

Even if the host device does not have a sufficiently large vacant memory space to load the entire program memory to be transferred, segments of data can be sequentially, temporarily loaded in a smaller area in host memory 102. In this case, since an address can be automatically converted and the data is written in interface memory 202, a sufficiently large vacant memory space for the entire program data need not be found. In fact, if host CPU 101 includes such an instruction in its instruction set, the program data need not even be stored in CPU memory 102 at all.

As another embodiment, when host CPU 101 transfers data from disk device 103 to interface memory 202 without using DMAC 104, data transfer can be performed in the same manner as described above.

In the above embodiments, program data transfer between the host device and the interface device has been described. For example, the present invention can be applied to a case wherein in an apparatus with two or more CPUs, a host CPU transfers program data to a memory of each sub CPU.

Although only a few exemplary embodiments of this invention have been described in detail above, those skilled in the art will readily appreciate that many modifications are possible in the preferred embodiments without materially departing from the novel teachings and advantages of this invention. Accordingly, all such modifications are intended to be included in this invention as defined by the following claims.

What is claimed is:

1. A data transfer apparatus for simultaneously writing data from an external storage device connected to a first bus in a first memory connected to said first bus and a second memory connected to a second bus, comprising:
   control means, connected to said first bus, for reading out data from said external storage device and sending a first address of said first memory;
   simultaneous write control means, connected to said first and second buses, for: 1) fetching said first address from said control means, 2) converting the fetched address into a corresponding second address of said second memory, and 3) simultaneously enabling writing in said first and second memories; and
   bus connecting means, connected to said first and second buses, for controlling connection and disconnection of a data line of said first bus and a data line of said second bus under the simultaneous write enabling of said simultaneous write control means,
   wherein said control means writes the data read out from said external storage device at the first address of said first memory, and
   when the data line of said first bus and the data line of the second bus are connected by said bus connecting means, said simultaneous write control means writes the data read out from said external storage device by said control means at the converted second address of said second memory.

2. An apparatus according to claim 1, wherein said simultaneous write control means comprises:
   means for holding a difference between addresses of said first and second memories at which writing is to start;
   address conversion means for converting the first address from said control means into the second address of said second memory in accordance with the difference between addresses held in said holding means;
   instruction means for commanding said bus connecting means to connect or disconnect the data line of said first bus and the data line of said second bus; and
   means for, when the data line of said first bus and the data line of said second bus are connected by said bus connecting means, writing the data read out from said external storage device by said control means at the second address of said second memory, which is converted by said address conversion means.

3. An apparatus according to claim 1, wherein said control means comprises central processing means for controlling said first memory and said simultaneous write control means.

4. An apparatus according to claim 3, wherein said simultaneous write control means includes means for holding an address and said central processing means sets a difference between the addresses of said first and second memories at which writing is to start in said holding means.

5. An apparatus according to claim 1, wherein said control means comprises:
   central processing means for controlling said first memory and said simultaneous write control means; and
   direct memory access control means, connected to said first bus, for reading out data from said external storage device and outputting the first address of said first memory in accordance with an instruction from said central processing means.

6. An apparatus according to claim 5, wherein said simultaneous write control means includes means for holding an address and said central processing means sets a difference between the addresses of said first and second memories at which writing is to start in said holding means.

7. An apparatus according to claim 1, wherein said control means outputs a command for releasing said second bus to said simultaneous write control means at the beginning of data transfer, and said simultaneous write control means receives the release command and causes a bus master with the right to use said second bus to release said second bus.

8. A data transfer apparatus for simultaneously writing data from an external storage device connected to a first bus in a first memory connected to said first bus and a second memory connected to a second bus, said first bus including a first address bus, a first data bus, and a first control line, and said second bus including a second address bus, a second data bus, and a second control line, comprising:
   control means, connected to said first bus, for reading out data from said external storage device and sending a first address of said first memory onto said first address bus;

simultaneous write control means, connected to said first and second buses, for: 1) fetching said first address on said first address bus, 2) converting the fetched address into a corresponding second address of said second memory, 3) outputting the converted address onto said second address bus, and 4) simultaneously enabling writing in said first and second memories; and bus connecting means, connected to said first and second data buses, for controlling connection and disconnection of said first and second data buses under the simultaneous write enabling of said simultaneous write control means, wherein said control means outputs a write signal for said first memory onto said first control line, and writes the data read out from said external storage device at the first address of said first memory, and when said first and second data buses are connected by said bus connecting means, said simultaneous write control means outputs a write signal for said second memory onto said second control line, and writes the data read out from said external storage device by said control means at the converted second address of said second memory.

9. An apparatus according to claim 8, wherein said simultaneous write control means comprises:

means for holding a difference between addresses of said first and second memories at which writing is to start;

address conversion means for fetching the first address on said first address bus and converting the fetched address into the second address of said second memory in accordance with the difference between addresses held in said holding means;

instruction means for commanding said bus connecting means to connect or disconnect said first and second data buses; and means for, when said first and second data buses are connected by said bus connecting means, outputting a write signal for said second memory onto said second control line, and writing the data read out from said external storage device by said control means at the second address of said second memory, which is converted by said address conversion means.

10. An apparatus according to claim 8, wherein said control means comprises central processing means for controlling said first memory and said simultaneous write control means.

11. An apparatus according to claim 10, wherein said simultaneous write control means includes means for holding an address and said central processing means sets a difference between the addresses of said first and second memories at which writing is to start in said holding means.

12. An apparatus according to claim 8, wherein said control means comprises:

central processing means for controlling said first memory and said simultaneous write control means; and direct memory access control means, connected to said first bus, for reading out data from said external storage device, outputting a write signal for said first memory onto said first control bus, and outputting the first address of said first memory onto said first address bus in accordance with an instruction from said central processing means.

13. An apparatus according to claim 12, wherein said simultaneous write control means includes means for holding an address and said central processing means sets a difference between the addresses of said first and second memories at which writing is to start in said holding means.

14. An apparatus according to claim 8, wherein said control means outputs onto said first control line a command for releasing said second bus to said simultaneous write control means at the beginning of data transfer, and said simultaneous write control means receives the release command and causes a bus master with the right to use said second bus to release said second bus.

15. A data transfer method for simultaneously writing data from an external storage device connected to a first bus in a first memory connected to said first bus and in a second memory connected to a second bus, comprising the steps of:

reading out data from said external storage device onto said first bus;

outputting an address of said first memory at which data may be written onto said first bus;

converting the address of said first memory on said first bus into a corresponding address of said second memory and outputting the converted address onto said second bus; and simultaneously writing the data into said first memory in accordance with said address of said first memory on said first bus and into said second memory in accordance the converted write address output on said second bus.

16. A method according to claim 15, wherein when the data is read out from said external storage device, a data line of said first bus and a data line of said second bus are connected to each other.

17. A method according to claim 15, wherein when data transfer to said second memory is started, said second bus is released from other control.

* * * * *